United States Patent [19]

Anguera

[11] Patent Number: 4,780,004
[45] Date of Patent: Oct. 25, 1988

[54] ASSEMBLY FOR SUPPORTING IN TERMS OF ROTATION AND FOR SEALING A FIRST ELEMENT ROTATING IN A SECOND ELEMENT

[75] Inventor: Narciso M. Anguera, Barcelona, Spain

[73] Assignee: Bendix Espana S.A., Barcelona, Spain

[21] Appl. No.: 54,632

[22] Filed: May 27, 1987

[51] Int. Cl.⁴ .............................................. F16C 33/60
[52] U.S. Cl. ..................................... 384/484; 384/505
[58] Field of Search ............... 384/484, 505, 486, 485, 384/477, 501

[56] References Cited

U.S. PATENT DOCUMENTS

| | | | |
|---|---|---|---|
| 3,753,603 | 8/1973 | Pinner et al. | 384/505 |
| 3,801,171 | 4/1974 | Rozentals | 384/505 |
| 4,015,883 | 4/1977 | Taylor | 384/484 |

FOREIGN PATENT DOCUMENTS 507679 9/1920 France .................................. 384/505

Primary Examiner—Lenard A. Footland
Attorney, Agent, or Firm—Larry J. Palguta; Ken C. Decker

[57] ABSTRACT

The assembly for supporting in terms of rotation and for sealing a first element (2; 5) rotating in a second element (7) comprises an outer raceway structure consisting of two sheet-metal half-raceways (11; 12) having two coupled outer collar portions (13; 14) serving for mounting the outer raceway structure in an orifice in the second element, and a first (13) of the outer half-raceways carrying the lip seal (22) interacting with the first element (2; 5) forming the inner raceway (10) typically has an extension part (21) opposite the collar portion (13), the lip seal (22) advantageously having a peripheral part (23; 23') forming a static seal and interacting in engagement contact with a wall of the orifice in the second element.

11 Claims, 1 Drawing Sheet

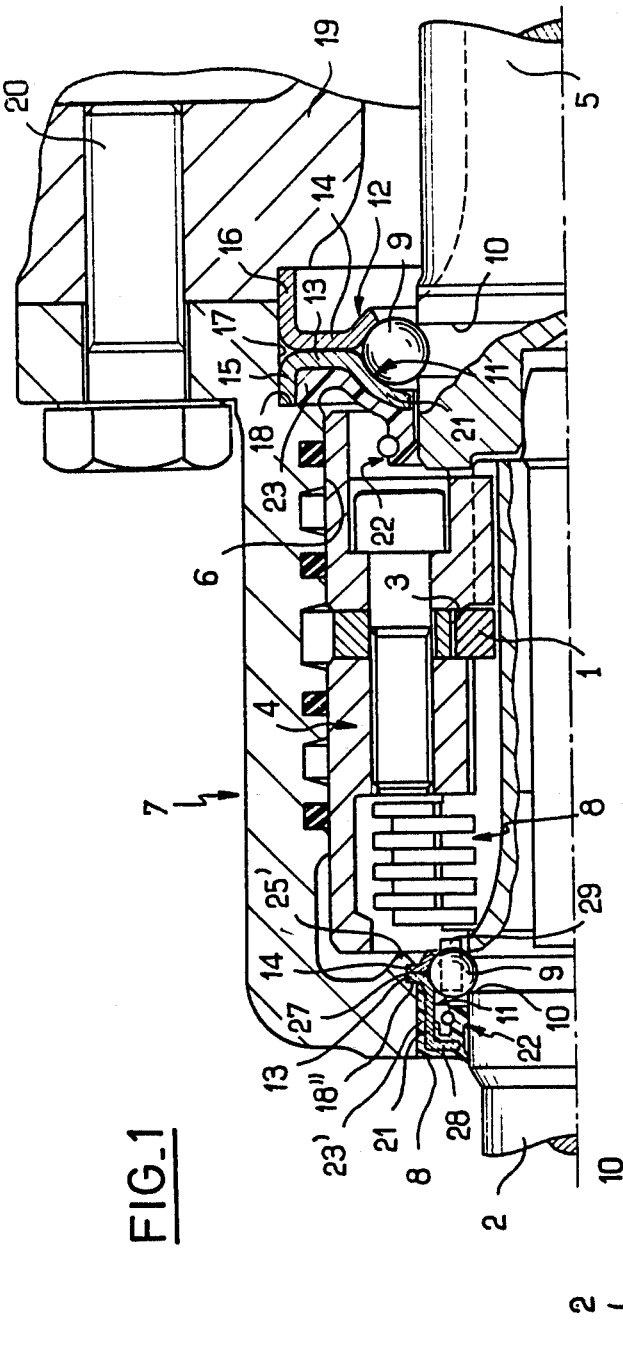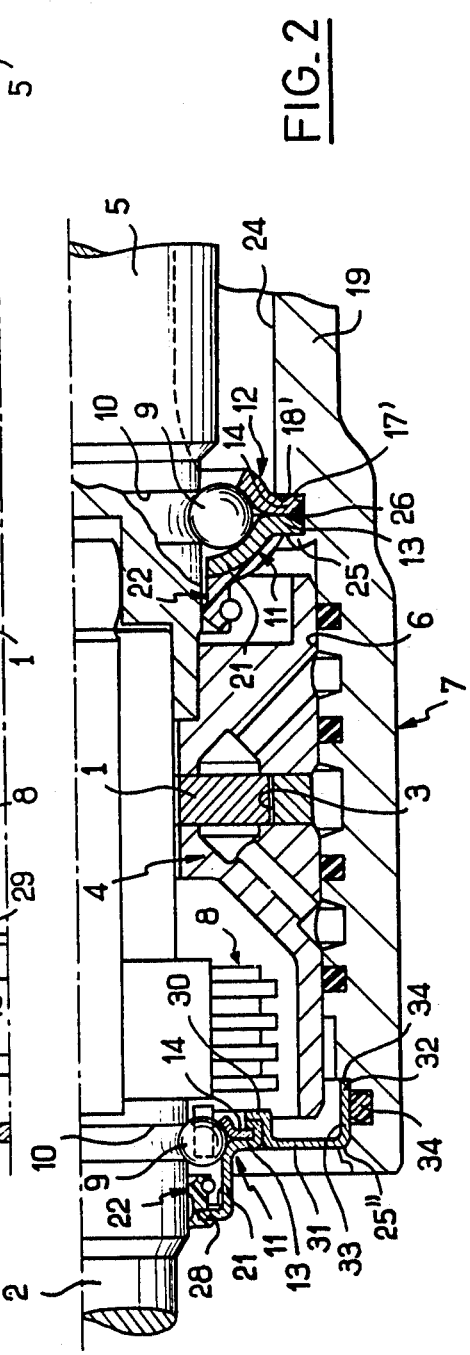
FIG_1
FIG.2

ASSEMBLY FOR SUPPORTING IN TERMS OF ROTATION AND FOR SEALING A FIRST ELEMENT ROTATING IN A SECOND ELEMENT

The present invention relates to an assembly for supporting in terms of rotation and for sealing a first element rotating in a second element, more particularly, but not exclusively a rotary element of a distributor valve of a servo-mechanism, especially for a power-assisted vehicle steering system, rotating in a hydraulic distributor housing and of the type comprising an outer raceway structure mounted in an orifice in the second element and through which passes the first element, and carrying a lip seal, the inner raceway structure being formed on the first element.

An assembly of this type is described in the document GB-A-2,122,152. In this document, the lip seal (interacting with a second rotary element separate from the first rotary element forming the raceway) is mounted in the outer raceway structure which is in the form of a solid tubular piece which has to be precision-machined.

It is therefore an object of the invention to provide an assembly of the above-mentioned type, of robust and light-weight design and with low production and assembly costs, suitable for production in very large series and offering a wide range of possibilities of arrangement in situ between the first and second elements.

To this end according to a feature of the invention, the outer raceway structure consists of two sheet-metal half-raceways having two outer collar portions coupled to one another and serving for mounting the raceway structure in the orifice in the second element, a first of the two half-raceways carrying the lip seal.

The document FR-A-2,364,802 in particular already makes known an outer raceway consisting of two half-raceways joined together by means of an annular nut in the orifice in the second element, but the two half-raceways are produced from machined annular metal blanks, dynamic sealing being ensured by O-ring seals carried by the first rotary element and interacting with the wall of the orifice in the second element, in an arrangement which is difficult and costly in terms of production and assembly.

The invention will now be described by way of example with reference to the accompanying drawings in which:

FIG. 1 is a longitudinal half-section through a rotary hydraulic distributor for a power-assisted steering system, putting into practice and a first and a second embodiment of assemblies for supporting in terms of rotation and for sealing according to the invention; and FIG. 2 is a half-view in longitudinal section, symmetrical relative to that of FIG. 1 and showing third and fourth embodiments of assemblies for supporting in terms of rotation and for sealing according to the invention.

In the following description and in the drawings, identical or similar elements bear the same reference numerals, if appropriate with an index.

The figures show diagrammatically a hydraulic distributor for a power-assisted vehicle steering system, of the type described in the document EP-A-0,095,415 in the applicant's name, and essentially comprising a star-shaped rotor 1 coupled in terms of rotation to an input shaft 2 and received in a disk-shaped chamber 3 of a cylindrical stator designated as a whole by the reference 4, coupled in terms of rotation to a coaxial output shaft 5 and supported rotatably in a bore 6 of a distributor housing 7. The stator 4 and the input shaft 2 are coupled by means of a flexible idle-travel coupling having a series of C-shaped springs 8, as described in the document EP-A-0,077,710 in the applicant's name. As can be seen in the drawings, the input shaft 2 is sealingly supported rotatably in an entry orifice consisting of a coaxial central bore 6 made in a front wall of the housing 7, while the output shaft 5 is sealingly supported rotatably in the housing 7.

Reference will first be made to the assembly for supporting in terms of rotation and for sealing between the output shaft 5 and the housing 7, as shown in Figure 1. According to the invention, the bearing balls 9 are positioned between an inner raceway 10 formed in the output shaft 5 and an outer raceway structure formed by joining together two half-raceways 11 and 12 produced by shaping from sheet steel and each comprising a profiled central portion forming an annular rolling track for the balls 9 and a straight radial outer collar portion 13 and 14 respectively, coupled to one another via their adjacent faces in a mid-plane of the rolling track, during the mounting of the outer raceway, as will be seen below. In the example under consideration, the collar portions 13 and 14 are extended on the outside by coaxial cylindrical ring portions 15 and 16 extending in opposite directions on either side of the joining mid-plane of the collar portions 13 and 14, these outer ring portions 15 and 16 being fitted in an end of widened diameter 17 of the bore 6 connected to the latter via a radial shoulder 18.

The outer raceway structure is locked in position in the portion of widened diameter 17, with the axial end of the ring portion 15 up against the shoulder 18, by means of a body part 19 placed on the housing 7 and fastened to the latter by means of bolts 20. According to one aspect of the invention, a first (13) of the outer half-raceways has an extension part 21 opposite the collar portion 13 and carrying a lip seal structure 22, typically including a garter spring, for interacting in rotary sealing contact with the output shaft 5, the lip seal structure 22 having a peripheral portion 23 located in the region of the angle between the outer ring portion 15 and the collar 13 and interacting in axial engagement contact with the shoulder 18, thus forming a static seal between the outer raceway structure and the housing 7. The lip seal structure 22, typically made of elastomeric material, is advantageously injection-molded onto the half-raceway 11.

Reference will now be made to the embodiment of the assembly for supporting in terms of rotation and for sealing the output shaft 5 in the alternative form shown in FIG. 2. In this alternative form, the body 19 is cast, here, integrally with the housing 7, the output shaft 5 projecting from the housing 7 through a bore 24 in the body 19. This bore 24 opens into the inner cavity of the housing 7, defined by the bore 6, via an end of widened diameter 17' connected to the bore 24 so as to form a radial shoulder 18'. The outer raceway structure for the balls 9 is formed in a similar way by joining together two half-raceways 11 and 12, of which the outer collar portions 13 and 14 are, here, mounted coupled to one another in the part of widened diameter 17' and locked in position in the latter, with the collar part 14 up against the shoulder 18', via zones 25, pushed back radially inwards, of the edge of the part of widened diameter 17' opening into the cavity of the housing 7. Here, the static seal consists of an O-ring seal 26 arranged in a peripheral trough between the two collar portions 13 and 14 and interacting with the inner cylindrical wall of the part of widened diameter 17'. In this embodiment, the lip seal 22 is injection-molded onto the extension part 21 of the half-raceway 11 up to the region of the outer collar portion 13.

Reference will now be made to the assembly for supporting in terms of rotation and for sealing the input shaft 2 in the orifice 8 in the housing 7, as shown in FIG. 1. The outer raceway structure has a general configuration similar to that just described in relation to the assembly for supporting in terms of rotation and for sealing the output shaft 5 according to FIG. 2, the outer collar portions 13 and 14 being mounted coupled to one another in an end of widened diameter 27 of the orifice 8 opening into the inner cavity of the housing 7 and being locked in position against the shoulder 18" via zones 25' pushed back radially, as before. In this embodiment, the extension part 21 opposite the collar portion 13 extends axially in the vicinity of the inner wall of the bore 8 and ends in a part turned radially inwards 28, positioning and reinforcing the lip seal structure 22 which has a portion, likewise injection-molded onto the extension part 21 and extending so as to overlap the latter, to form a peripheral part constituting a static seal 23' interacting in radial engagement with the inner wall of the bore 8. In this embodiment, it will be noted that the balls 9 are positioned and retained in the bearing by means of a ball cage 29.

Finally, reference will be made to the alternative embodiment of the assembly for supporting in terms of rotation and for sealing the input shaft 2 in the housing 7 in the alternative form shown in FIG. 2. In this embodiment, the collar portion 13 is extended, with outer overlapping, round the periphery of the collar portion 14 and is itself mounted in a trough 30 formed at the end of a supporting piece 31 advantageously made of sheet metal and comprising a coaxial peripheral ring portion 32 mounted in an end part of widened diameter 33 of the bore 6 of the housing 7 connected to the latter via a shoulder 34. The outer ring part 32 is mounted in the widened end part 33 and locked up against the shoulder 34 by means of bent portions 25", as in the two preceding embodiments. Here, static sealing is ensured by an O-ring seal 34 arranged in an annular groove opening into the widened end portion 33 and interacting with the ring portion 32 of the support 31. In this embodiment, the lip seal 22 is limited to an active zone injection-molded onto the end of the inward-turned end portion 28 of the extension part 21 of the outer half-raceway 11.

Although the present invention has been described with reference to particular embodiments, it is not limited thereby, but on the contrary can have modifications and alternative forms which will emerge to a person skilled in the art. In particular, as required, the outer collar portions 13, 14 of the outer half-raceways can be preassembled in position, coupled to one another, before being mounted in the second element, for example by means of electrical welding or adhesive bonding, or during the injection-molded-on of the lip seal by means of portions of elastomeric material injected into apertures facing one another in these collar portions.

I claim:

1. Assembly for supporting in terms of rotation and for sealing a first element rotating in a second element, comprising an outer raceway structure mounted in an orifice, in the second element and through which passes the first element, and carrying a lip seal, the inner raceway being formed on the first element, characterized in that the outer raceway structure comprises two sheet-metal half-raceways having two coupled radial outer collar portions serving for mounting the outer raceway structure in the orifice, a first of the two half-raceways carrying the lip seal interacting with the first rotary element.

2. Assembly according to claim 1, characterized in that the first half-raceway has an extension part opposite the collar portion and carrying the lip seal.

3. Assembly according to claim 2, characterized in that the outer raceway structure carries a static seal interacting in engagement contact with a wall of the orifice.

4. Assembly according to claim 3, characterized in that the lip seal is injection-molded on to at least the extension part of the first outer half-raceway.

5. Assembly according to claim 4, characterized in that the lip seal has a peripheral part forming the static seal.

6. Assembly according to claim 5, characterized in that the extension part comprises an axially extending portion, and the peripheral part, forming the static seal, of the lip seal is arranged between the latter and the wall of the bore.

7. Assembly according to claim 6, charcterized in that the collar portions are extended on the outside by coaxial ring portions received in the stepped receptacle.

8. Assembly according to claim 7, characterized in that the peripheral part, forming the static seal, of the lip seal is arranged in the vicinity of the axial ring portion of the first half-raceway and interacts in axial engagement with the shoulder of the stepped receptacle.

9. Assembly according to claim 1, characterized in that the outer collar portions are received in a stepped receptacle of the orifice and are blocked in this receptacle by locking means.

10. Assembly according to claim 9, characterized in that the locking means is formed by at least one pushed-back zone of the stepped receptacle.

11. Assembly according to claim 10, characterized in that the orifice consists of a bore coaxial relative to the first element, formed in the second element and having an end of widened diameter connected to the bore via a radial shoulder delimiting the stepped receptacle.

* * * * *